(12) United States Patent
Yoshikawa

(10) Patent No.: US 11,140,539 B2
(45) Date of Patent: Oct. 5, 2021

(54) WIRELESS COMMUNICATION APPARATUS, WIRELESS COMMUNICATION METHOD, PROGRAM, AND STORAGE MEDIUM

(71) Applicant: CANON KABUSHIKI KAISHA, Tokyo (JP)

(72) Inventor: Yuki Yoshikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/676,919

(22) Filed: Nov. 7, 2019

(65) Prior Publication Data

US 2020/0145811 A1 May 7, 2020

Related U.S. Application Data

(62) Division of application No. 15/748,754, filed as application No. PCT/JP2016/003834 on Aug. 23, 2016, now Pat. No. 10,511,953.

(30) Foreign Application Priority Data

Sep. 24, 2015 (JP) .................................. 2015-187442

(51) Int. Cl.
*H04W 8/00* (2009.01)
*H04W 64/00* (2009.01)
*H04W 84/20* (2009.01)
*H04W 84/12* (2009.01)

(52) U.S. Cl.
CPC ......... *H04W 8/005* (2013.01); *H04W 64/003* (2013.01); *H04W 84/20* (2013.01); *H04W 84/12* (2013.01)

(58) Field of Classification Search
None
See application file for complete search history.

(56) References Cited

U.S. PATENT DOCUMENTS

| 10,356,720 | B2* | 7/2019 | Park | H04W 52/0229 |
|---|---|---|---|---|
| 2008/0089300 | A1* | 4/2008 | Yee | H04W 76/10 370/338 |
| 2013/0268654 | A1* | 10/2013 | Abraham | H04L 45/26 709/224 |
| 2014/0211659 | A1 | 7/2014 | Abraham et al. | |
| 2015/0036540 | A1 | 2/2015 | Kasslin et al. | |
| 2015/0098388 | A1* | 4/2015 | Fang | H04W 48/18 370/328 |
| 2015/0131529 | A1 | 5/2015 | Zhou et al. | |

(Continued)

OTHER PUBLICATIONS

Camps-Mur Daniel et al.: "Enabling always on service discovery: Wifi neighbor awareness networking", IEEE Wireless Communications, IEEE Service Center, Piscataway, NJ, US, vol. 22, No. 2, Apr. 1, 2015, pp. 118-125.

(Continued)

*Primary Examiner* — Eunsook Choi
(74) *Attorney, Agent, or Firm* — Venable LLP

(57) ABSTRACT

A wireless communication apparatus which can perform communication in a system for performing communication during a predetermined period which repeatedly starts in a predetermined cycle and during which a beacon is transmitted or received receives signals during the predetermined period, and transmits information about the number of transmission sources of the received signal.

5 Claims, 14 Drawing Sheets

(56) References Cited

U.S. PATENT DOCUMENTS

| | | | |
|---|---|---|---|
| 2015/0200811 A1* | 7/2015 | Kasslin | H04L 41/0853 370/254 |
| 2015/0382301 A1* | 12/2015 | Huang | H04W 52/02 370/311 |
| 2016/0286398 A1* | 9/2016 | Abraham | H04L 63/123 |
| 2017/0034769 A1* | 2/2017 | Kim | H04W 48/10 |
| 2018/0213388 A1 | 7/2018 | Kim et al. | |
| 2019/0098680 A1* | 3/2019 | Park | H04W 76/14 |

OTHER PUBLICATIONS

International Search Report and Written Opinion issued in parent International Application No. PCT/JP2016/003834 dated Oct. 19, 2016.

\* cited by examiner

[Fig. 1]
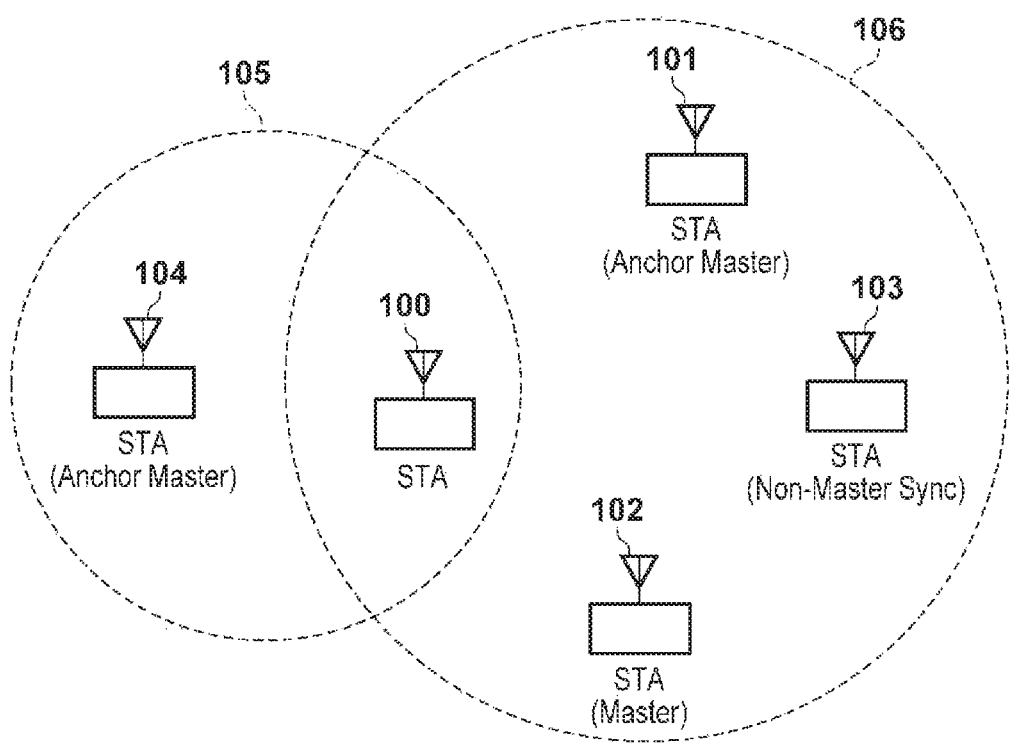

[Fig. 2]
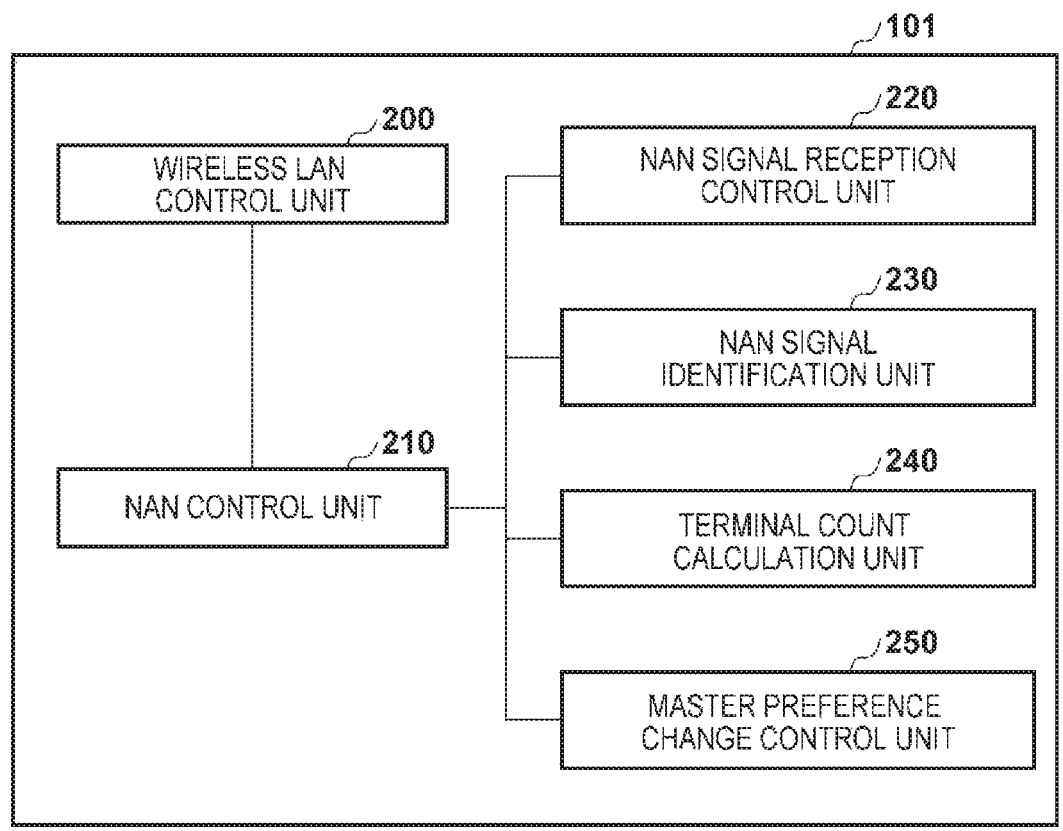
[Fig. 3]
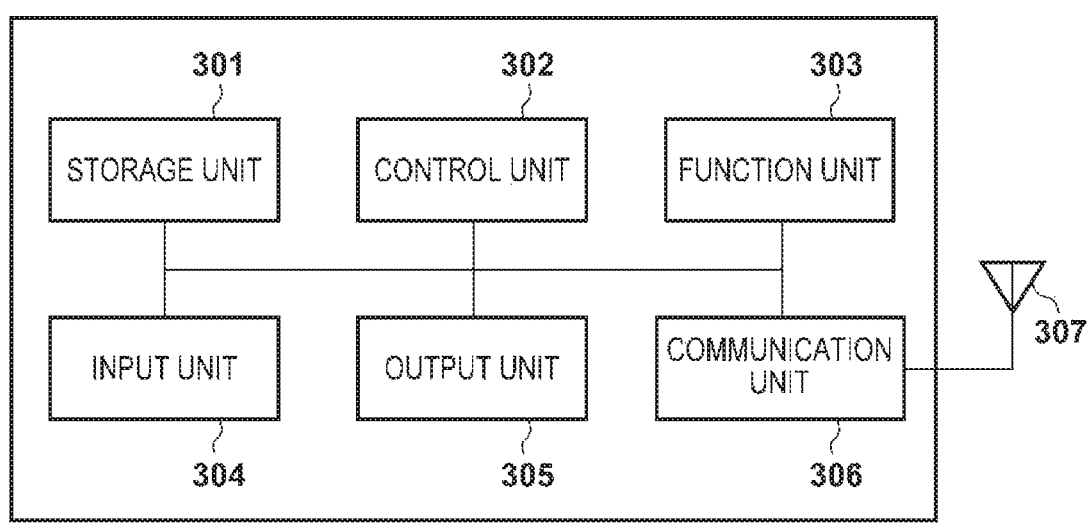

[Fig. 4]
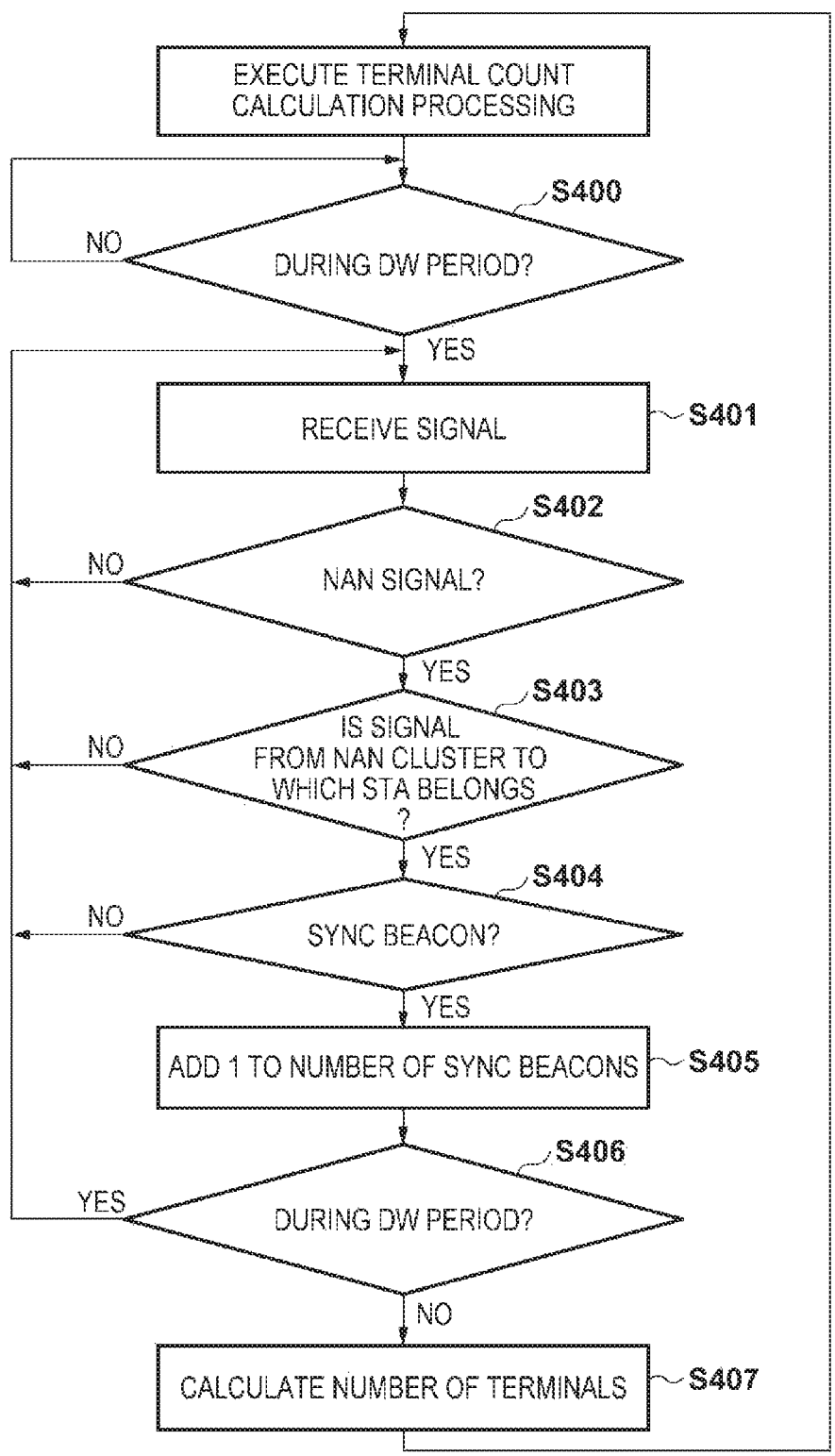

[Fig. 5]
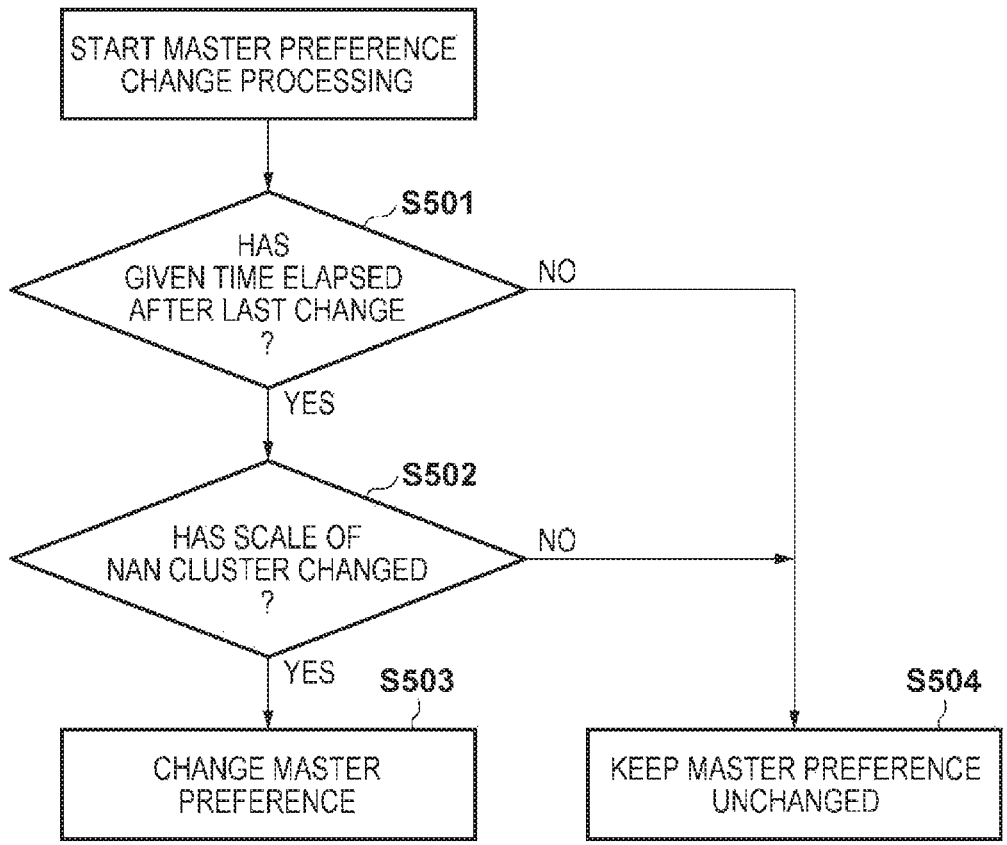
[Fig. 6]
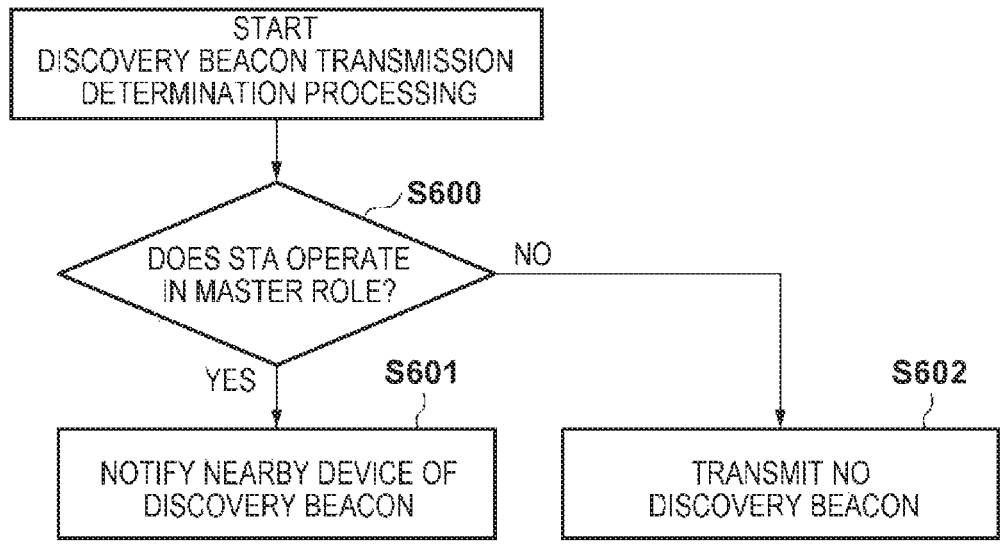

[Fig. 7]
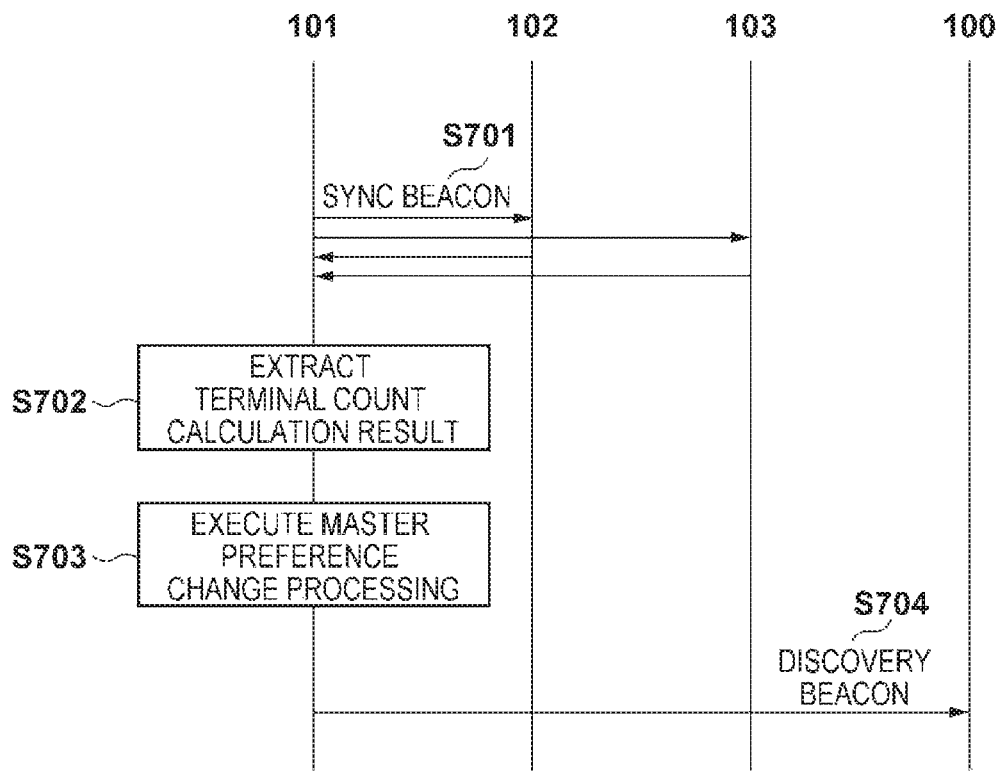
[Fig. 8]
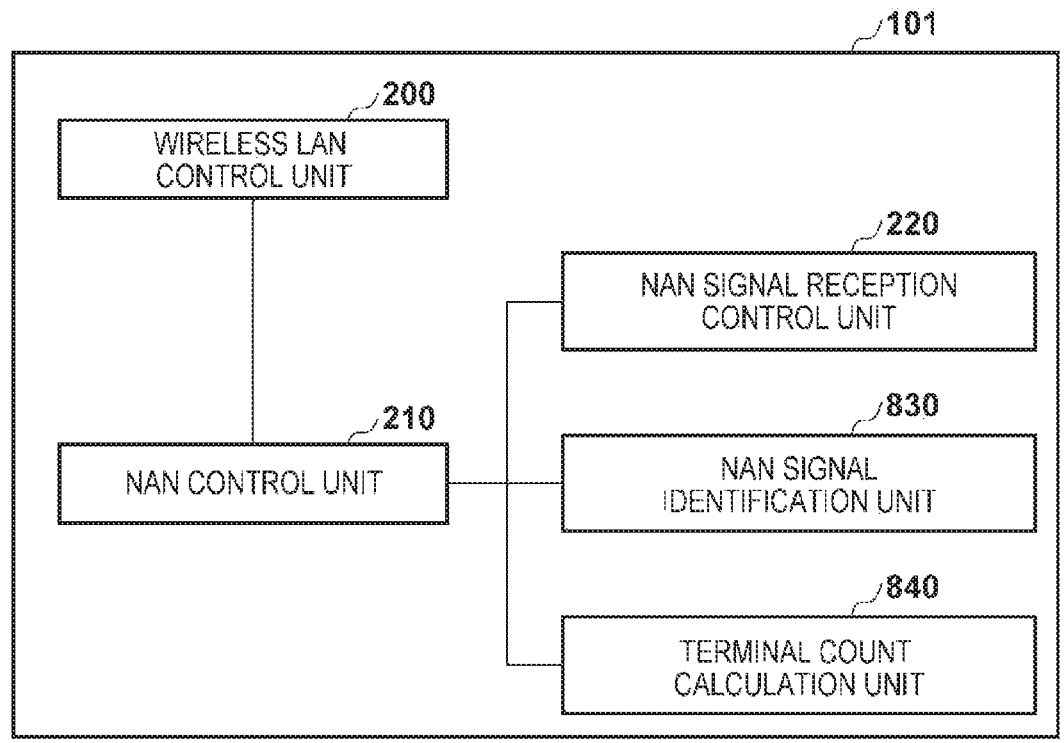

[Fig. 9]
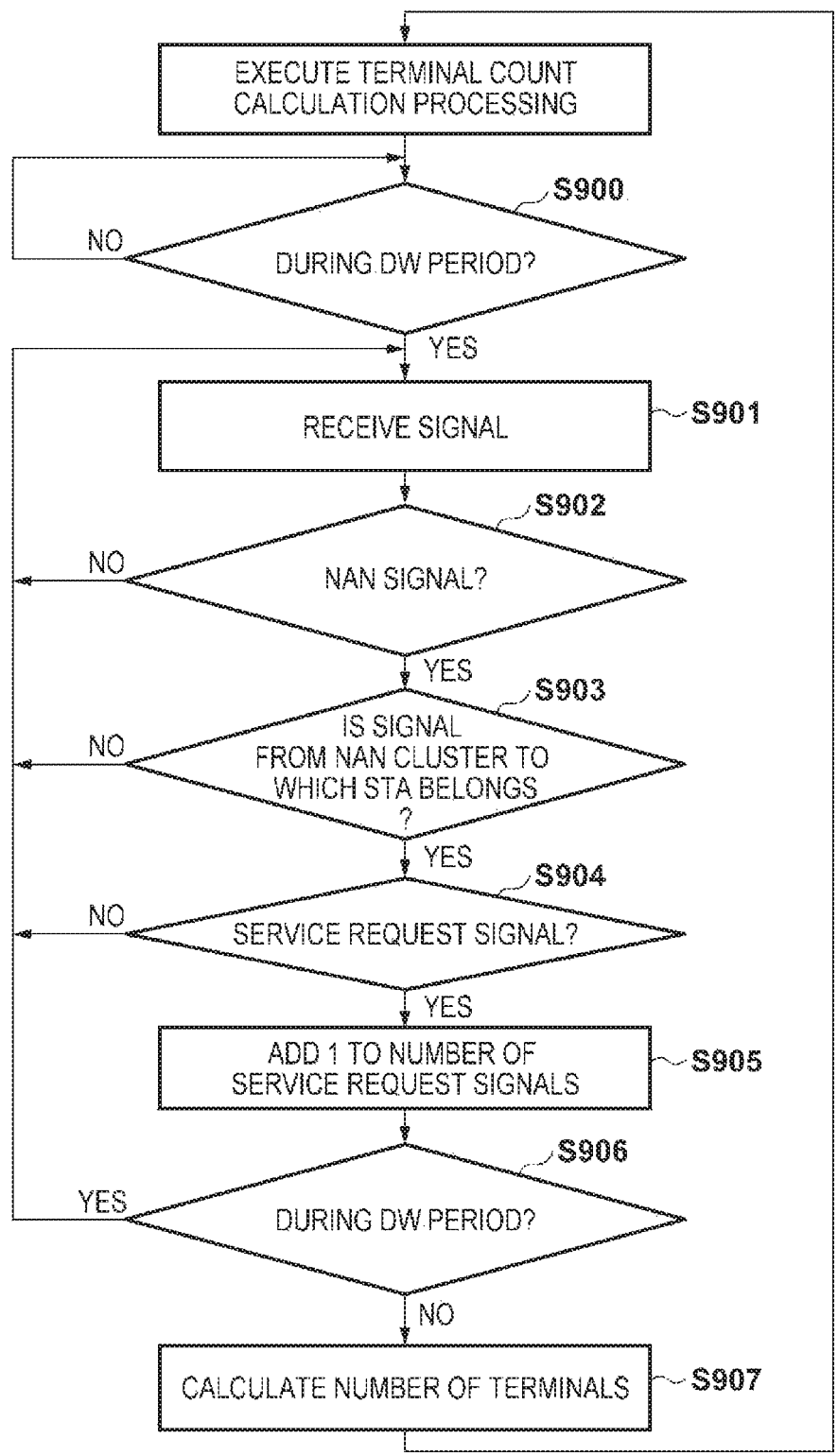

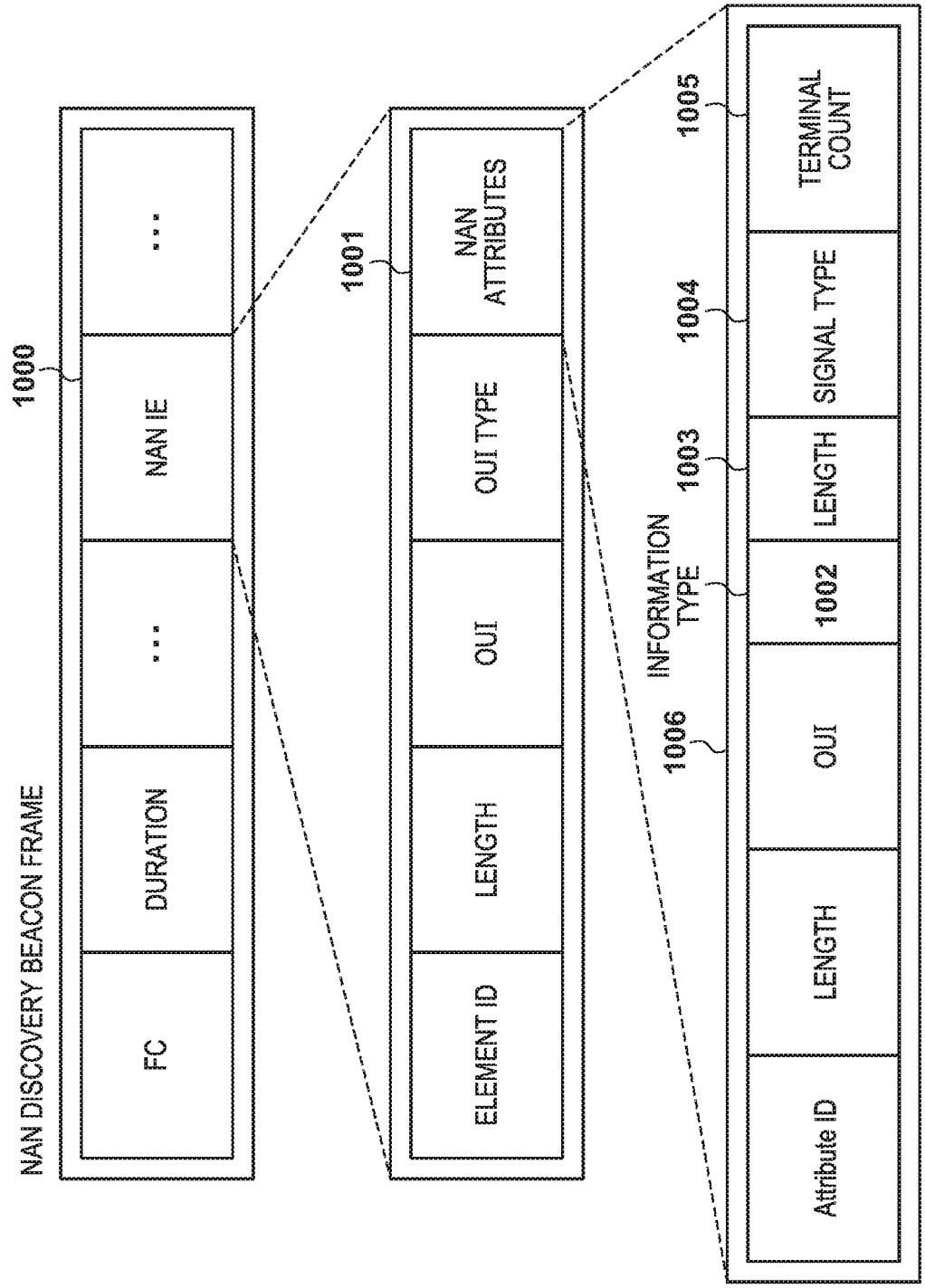

[Fig. 11]
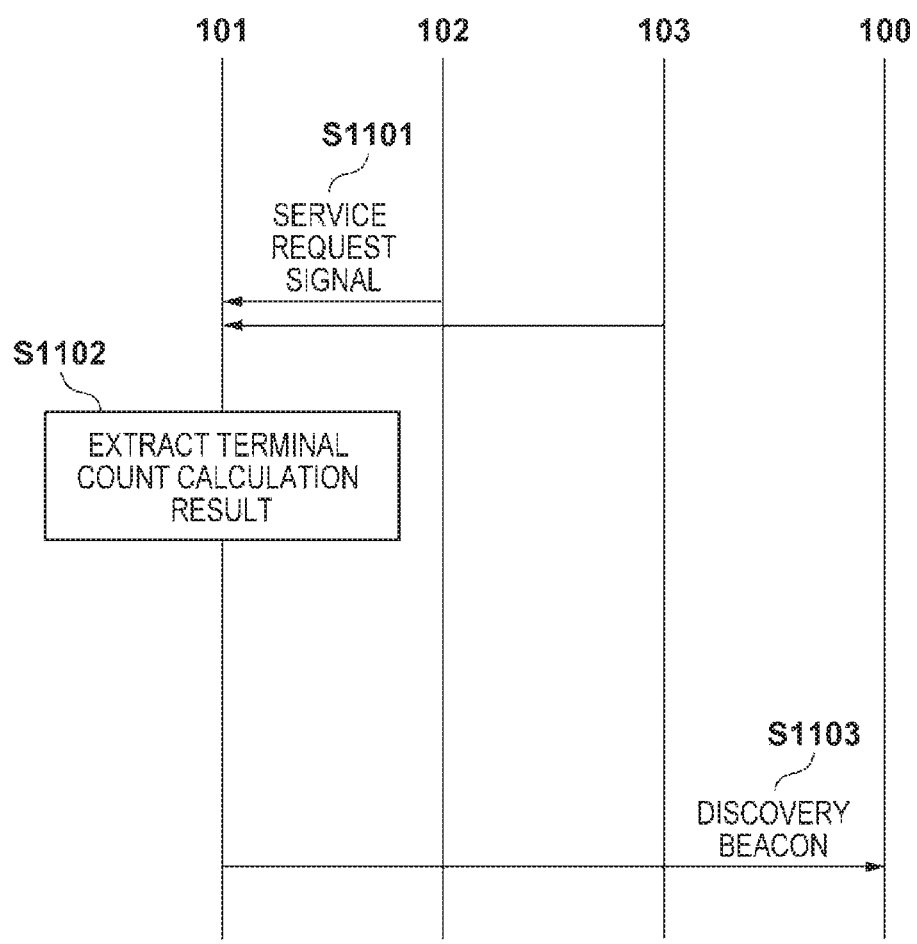

[Fig. 12]
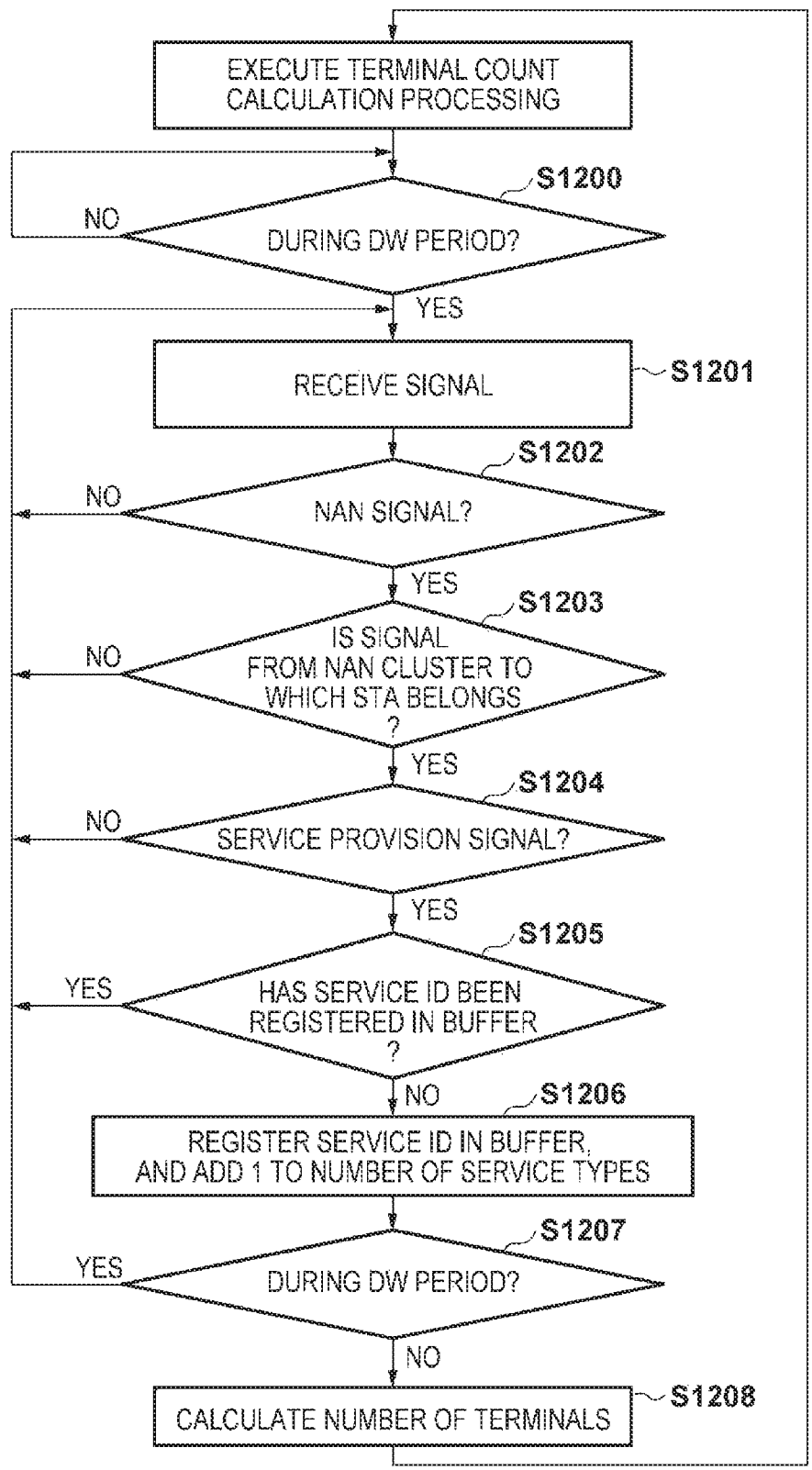

[Fig. 13]
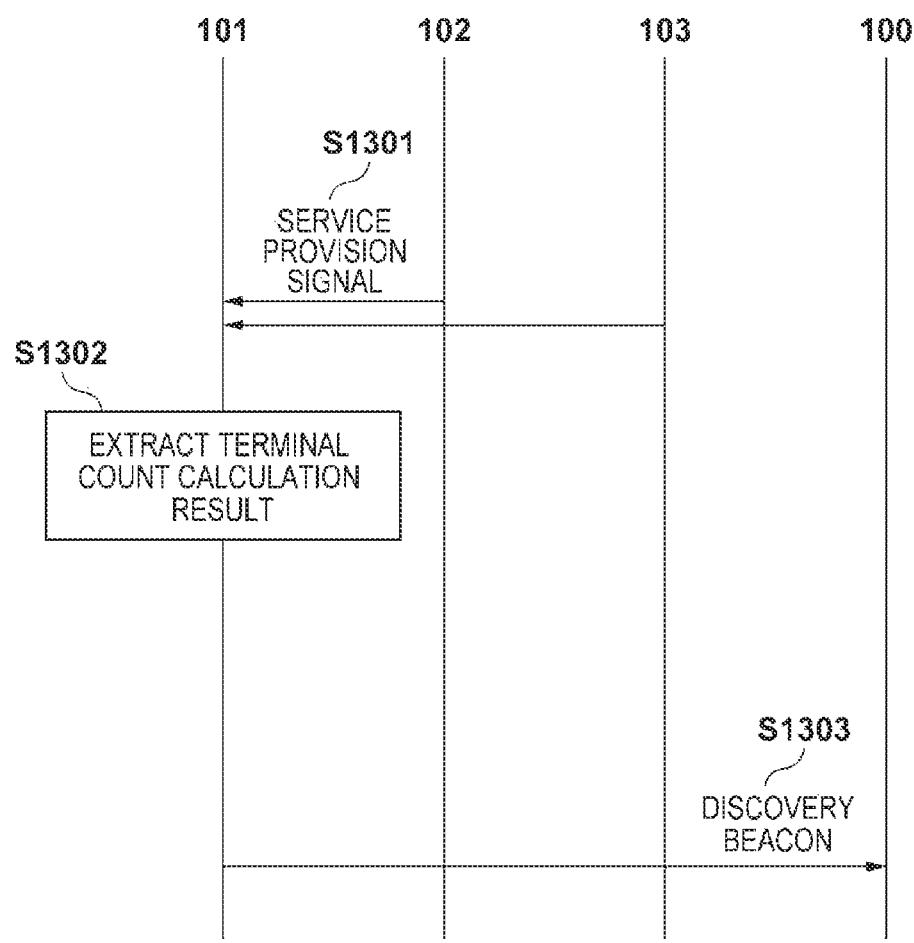

WIRELESS COMMUNICATION APPARATUS, WIRELESS COMMUNICATION METHOD, PROGRAM, AND STORAGE MEDIUM

CROSS-REFERENCE TO RELATED APPLICATIONS

This application is a Divisional of U.S. patent application Ser. No. 15/748,754, filed on Jan. 30, 2018, which is a 371 of international application No. PCT/JP2016/003834, filed on Aug. 23, 2016, which claims priority to Japanese Patent Application No. 2015-187442, filed on Sep. 24, 2015, the entire contents of which are all hereby incorporated by reference herein.

TECHNICAL FIELD

The present invention relates to a wireless communication apparatus, a wireless communication method, a program, and a storage medium.

BACKGROUND ART

In recent years, a wireless LAN system complying with IEEE802.11 has been widely used. Along with this, there has been proposed a technique in which a wireless LAN terminal readily discovers, with low power consumption, a wireless LAN application and information obtained by communication. U.S. Patent Application Publication No. 2015/0036540 describes Neighbor Awareness Networking (NAN), defined by Wi-Fi Alliance, for discovering a usable service and information before a wireless LAN terminal is connected to a nearby wireless LAN compatible terminal.

In NAN, a plurality of wireless LAN terminals form a cluster (to be referred to as a NAN cluster hereinafter). During a discovery window (DW) as a cyclic period, the terminal joining the NAN cluster transmits/receives a signal (to be referred to as a sync beacon hereinafter) for indicating the period of the DW and a signal for sharing application information and the like. The DW is a period during which the wireless LAN terminal joining the NAN cluster can share the existence of the terminal and information about a service application. A terminal which provides a service application transmits a service provision signal during the period of the DW. A terminal which is searching for a service application transmits a service request signal during the period of the DW.

In NAN, if a terminal detects a plurality of NAN clusters, it selects a NAN cluster to join based on the master preferences, for deciding to operate in a master role, of terminals respectively operating in anchor mater roles for deciding the timings of the DWs in the detected NAN clusters.

SUMMARY OF INVENTION

In the conventional technique, when a terminal which is to newly join a NAN cluster discovers a plurality of NAN clusters, it selects and joins one of the NAN clusters without knowing information about other terminals joining each NAN cluster. Therefore, for example, a terminal which is to newly join a NAN cluster may select and join a NAN cluster in which it may not be able to use a desired service application.

In one aspect, a wireless communication apparatus communicatable in a system in which a beacon is transmitted or received during a repeatedly predetermined period, comprises: reception means for receiving signals during the predetermined period; and transmission means for transmitting information about the number of transmission sources of the signals received by the reception means.

In another aspect, a wireless communication apparatus comprises: reception means for receiving a signal about Neighbor Awareness Networking (NAN) during a discovery window of NAN; and transmission means for transmitting information about a scale of a NAN cluster to which the wireless communication apparatus belongs, which is based on information received by the reception means.

In other aspect, a wireless communication apparatus comprises: reception means for receiving a signal for discovering a network; and decision means for deciding whether to join the network, based on information about the number of apparatuses joining the network, which is contained in the received signal.

In other aspect, a wireless communication method comprises: receiving, in a system in which a beacon is transmitted or received during a repeatedly predetermined period, signals during the predetermined period; and transmitting information about the number of transmission sources of the signals received in the receiving.

In other aspect, a wireless communication method comprises: receiving, by a communication apparatus, a signal about Neighbor Awareness Networking (NAN) during a discovery window of NAN; and transmitting information about a scale of a NAN cluster to which the wireless communication apparatus belongs, which is based on information received in the receiving.

In other aspect, a wireless communication method comprises: receiving a signal for discovering a network; and deciding whether to join the network, based on information about the number of apparatuses joining the network, which is contained in the received signal.

It is possible to provide, to an apparatus which is to newly join a network, information for selecting a more appropriate network.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1 is a view showing a wireless LAN system according to the first to third embodiments.

FIG. 2 is a block diagram showing the functional arrangement of each of STAs 101 to 104 according to the first and fourth embodiments.

FIG. 3 is a block diagram showing an STA hardware arrangement according to the first to third embodiments.

FIG. 4 is a flowchart illustrating an example of terminal count calculation processing according to the first embodiment.

FIG. 5 is a flowchart illustrating an example of master preference change processing according to the first and fourth embodiments.

FIG. 6 is a flowchart illustrating an example of discovery beacon transmission determination processing according to the first to fourth embodiments.

FIG. 7 is a sequence chart showing an example of a sequence when the number of terminals which have transmitted signals is calculated and a nearby terminal is notified of a change according to the first embodiment.

FIG. 8 is a block diagram illustrating the functional arrangement of each of STAs 101 and 104 according to the second and third embodiments.

FIG. 9 is a flowchart illustrating an example of terminal count calculation processing according to the second embodiment.

FIG. 10 is a view showing an example of the structure of a beacon frame according to the second, third, and fourth embodiments.

FIG. 11 is a sequence chart showing an example of a sequence when the number of terminals which have transmitted signals is calculated and a nearby terminal is notified of it according to the second embodiment.

FIG. 12 is a flowchart illustrating an example of terminal count calculation processing according to the third embodiment.

FIG. 13 is a sequence chart showing an example of a sequence when the number of terminals which have transmitted signals is calculated and a nearby terminal is notified of it according to the third embodiment.

DESCRIPTION OF EMBODIMENTS

Figure 14:
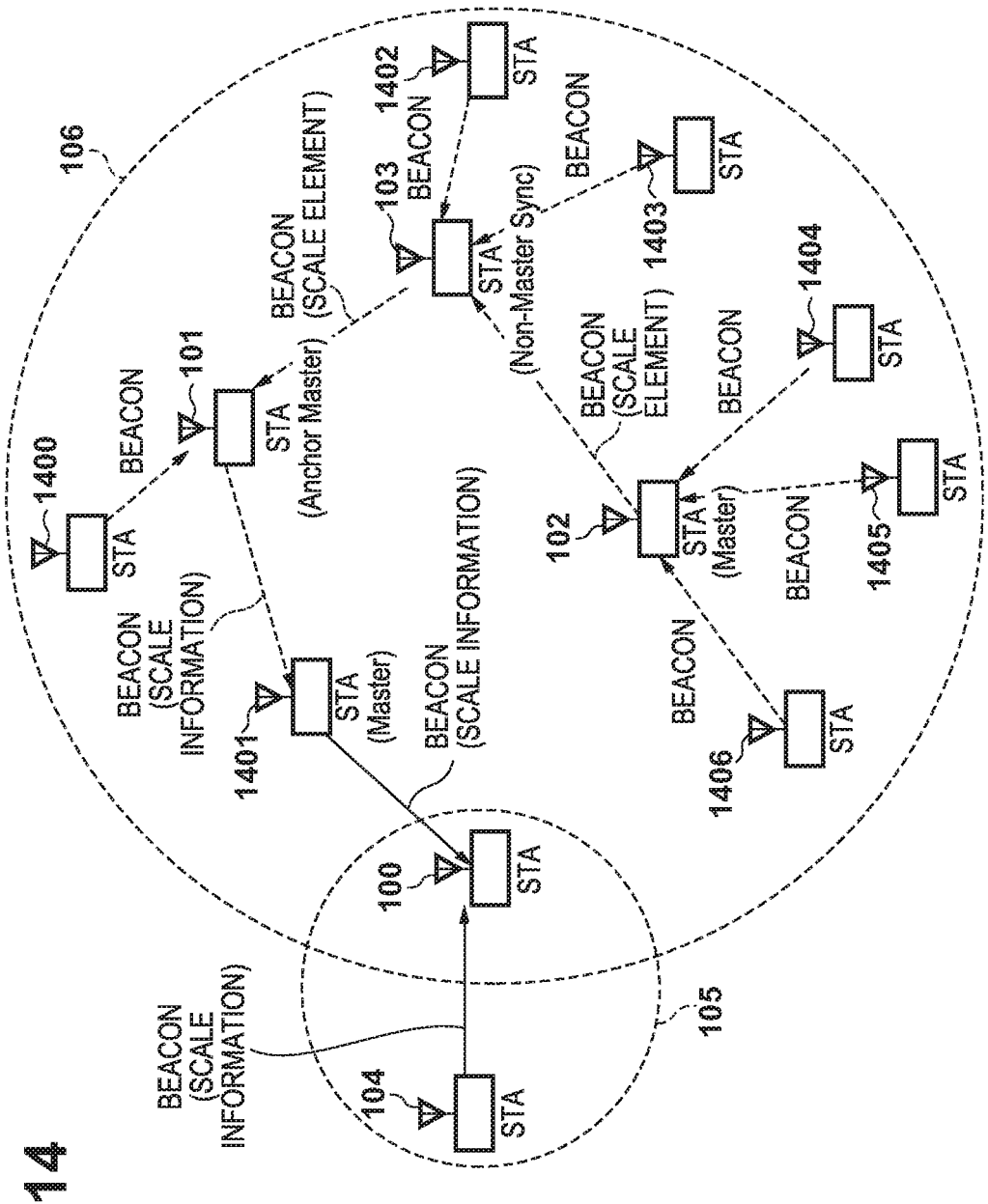
FIG. 14 is a view showing a wireless LAN system according to the fourth embodiment.

The present invention will be described in detail below based on embodiments of the present invention with reference to the accompanying drawings. Note that arrangements to be described in the following embodiments are merely examples, and the present invention is not limited to the illustrated arrangements.

First Embodiment

An example in which a wireless LAN system complying with the Neighbor Awareness Networking (NAN) standard is used will be explained below. In NAN, service information is communicated during a period called a DW. The DW indicates the convergence time and channel of a plurality of devices for executing NAN. A set of terminals which share the schedule of DWs is called a NAN cluster. Note that the DW is set in every predetermined cycle.

Each terminal belonging to the NAN cluster operates in one of master, non-master sync, and non-master non-sync roles. Each terminal belonging to the NAN cluster can communicate a beacon during the DW. The terminal operating in the master role transmits a synchronization beacon (to be referred to as a sync beacon hereinafter) as a beacon for causing each terminal to check the DW and synchronize with it. In addition, the terminal operating in the master role transmits a discovery beacon as a signal for causing a terminal, which does not belong to the NAN cluster, to recognize the NAN cluster. The discovery beacon is transmitted even during a period other than the DW periods for, for example, every 100 TUs (Time Units) (1 TU corresponds to 1,024 fEsec). Note that at least one terminal in each NAN cluster operates in the master role. Furthermore, in the NAN cluster, one master serves as an anchor master to determine a time reference in the NAN cluster, for example, decide the timings of the DWs.

The terminal operating in the non-master sync role transmits not a discovery beacon but a sync beacon. The terminal operating in the non-master non-sync role transmits neither a sync beacon nor a discovery beacon.

Based on the master ranks of the respective terminals, a specific one of the terminals belonging to the NAN cluster is decided to operate in the master or anchor master role. The master rank is calculated using a master preference, random factor, and NAN interface address. The master preference indicates the possibility that the terminal plays the master role. This value can be freely set by each terminal. The master preference needs to take the same value for a given time but the value can be changed. The random factor is a random number which needs to be changed every time a given time elapses. The NAN interface address is an address for identifying the terminal.

In accordance with the sync beacon, the terminal joining the NAN cluster communicates service information during the DW period in synchronous with the DW period set in every predetermined cycle. The terminals communicate, with each other, a subscribe signal as a signal for discovering or searching for a service and a publish signal as a signal for sending a notification of provision of a service during the DW period. Furthermore, the respective terminals can exchange follow-up signals for exchanging additional information about a service during the DW period. Note that the publish, subscribe, and follow-up signals will be collectively referred to as service discovery frames (SDFs) hereinafter. The respective terminals can advertise or detect the service by exchanging the SDFs. Each terminal joining the NAN cluster performs communication using channel 6 (2.437 GHz) in a frequency band of 2.4 GHz. In the NAN cluster, a DW of 16 TUs is set every 512 TUs. That is, in the NAN cluster, a DW of 16 TUs is repeatedly set every 512 TUs. The respective terminals joining the NAN cluster synchronize the schedules of DWs by sync beacons transmitted/received during the DWs.

As the first embodiment, a case in which the total number of terminals that transmit sync beacons in a NAN cluster is calculated will be described. The sync beacon is a signal for indicating a DW as a period defined in the NAN cluster. In this embodiment, a terminal operating in the anchor master role changes its master preference based on the total number of terminals which transmit sync beacons, and transmits a discovery beacon containing information based on the changed master preference, thereby indirectly sending a notification of the number of terminals. Among the master preference, random factor, and NAN interface address for determining the master rank, the master preference is restricted to take the same value for a given period but the value can be freely set.

FIG. 1 shows an example of a network configuration according to this embodiment. A wireless LAN terminal (to be referred to as an STA hereinafter) 100 is a terminal which is to join a NAN cluster, and STAs 101 to 104 are terminals which have already formed NAN clusters. The STAs 101 and 104 are terminals respectively operating in the anchor master roles in the NAN clusters. A NAN cluster 105 represents a NAN cluster formed from the STA 104. A NAN cluster 106 represents a NAN cluster formed from the STAs 101 to 103.

The STA 100 can detect the plurality of NAN clusters by receiving discovery beacons from the terminals respectively operating in the master roles in the NAN clusters 105 and 106. Each terminal operating in the master role transmits the discovery beacon, for example, every 100 TUs. However, if the discovery beacon transmission timing overlaps the period of the DW, the terminal operating in the master role transmits no discovery beacon.

The STA 101 is a terminal operating in the anchor master role in the NAN cluster 106. The STA 104 is a terminal operating in the anchor master role in the NAN cluster 105. The STA 100 receives the discovery beacons respectively transmitted from the STAs 101 and 104, and decides, based on pieces of information contained in the discovery beacons, one of the NAN clusters 105 and 106 to join. The STAs 102 and 103 are terminals included in the NAN cluster 106, and signals from these terminals do not always reach the STA 100. This embodiment has, as its feature, to perform, by each of the STAs 101 and 104, an operation to be described below. Note that the STAs 101 and 104 have the same arrangement, and thus only the STA 101 will be described below in terms of the same points.

FIG. 2 is a functional block diagram showing the STA 101 according to this embodiment. A wireless LAN control unit 200 performs control to transmit/receive a wireless signal to/from another wireless LAN apparatus. A NAN control unit 210 performs overall control of NAN, such as a procedure of detecting a NAN cluster and joining it, synchronization with another terminal in the NAN cluster, and decision of a role and a state in the NAN cluster.

A NAN signal reception control unit 220 controls reception of signals during the DWs defined in the NAN cluster. The terminal joining the NAN cluster can receive signals (for example, the sync beacon, subscribe signal, publish signal, and the like) during each DW. A NAN signal identification unit 230 identifies whether the received signal is a specific type of signal. For example, the NAN signal identification unit 230 reads the signal received by the NAN signal reception control unit 220, and confirms whether the NAN cluster to which the STA 101 belongs is the same as that indicated by the received signal. A practical method for this processing will be described below. Each cluster has a specific cluster ID. The cluster ID of the NAN cluster to which the STA 101 belongs is recorded in the STA 101, and the STA 101 contains, in a signal to be transmitted, the cluster ID of the NAN cluster to which it belongs. The NAN signal identification unit 230 confirms whether the cluster ID contained in the received signal is equal to that recorded in the STA 101. If the cluster ID contained in the received signal is different from that recorded in the STA 101, the STA 101 examines whether to join the NAN cluster of the cluster ID contained in the received signal.

Furthermore, the NAN signal identification unit 230 identifies whether the received signal is a sync beacon transmitted in the network to which the STA 101 belongs, that is, whether the received signal is the sync beacon of the NAN cluster 106. The sync beacon is a signal which can be transmitted by each of a terminal operating in the master role and a terminal operating in the non-master sync role, and is a signal for indicating the period of the DW. If the received signal is the sync beacon of the NAN cluster to which the STA 101 belongs, the NAN signal identification unit 230 sends data to a terminal count calculation unit 240 to calculate the number of terminals in the NAN cluster to which the STA 101 belongs.

As will be described later, the terminal count calculation unit 240 calculates the number of terminals which have transmitted the sync beacons in the NAN cluster to which the STA 101 belongs. A master preference change control unit 250 determines whether the master preference can be changed. The master preference change control unit 250 changes the master preference based on the number of terminals calculated by the terminal count calculation unit 240. The NAN control unit 210 performs control to generate a discovery beacon containing the master preference, and the wireless LAN control unit 200 performs control to transmit the generated discovery beacon.

FIG. 3 shows the hardware arrangement of each of the STAs 100 to 104. A storage unit 301 is formed by one or both of a ROM (Read Only Memory) and a RAM (Random Access Memory), and stores programs for performing various operations (to be described later) and various kinds of information such as communication parameters for wireless communication. Note that instead of the memory such as the ROM or RAM, a storage medium such as a flexible disk, hard disk, optical disk, magneto optical disk, CD-ROM, CD-R, magnetic tape, nonvolatile memory card, or DVD may be used as the storage unit 301.

A control unit 302 is formed by a CPU (Central Processing Unit) or MPU (Micro Processing Unit), and controls the overall apparatus by executing the programs stored in the storage unit 301. Note that the control unit 302 may control the overall STA 101 in cooperation with an OS (Operating System) and the programs stored in the storage unit 301. The control unit 302 controls a function unit 303 to execute predetermined processing such as imaging, printing, and projection.

The function unit 303 is hardware for executing predetermined processing. If, for example, the function unit 303 serves as an imaging unit, it performs imaging processing. If, for example, the function unit 303 serves as a printing unit, it performs print processing. If, for example, the function unit 303 serves as a projection unit, it performs projection processing. Data processed by the function unit 303 may be data stored in the storage unit 301 or data communicated with another STA via a communication unit 306 (to be described later).

An input unit 304 accepts various operations from the user. An output unit 305 performs various output operations to the user. The output from the output unit 305 includes at least one of display on a screen, a voice output from a loudspeaker, a vibration output, and the like. Note that both of the input unit 304 and the output unit 305 may be implemented by one module like a touch panel.

The communication unit 306 controls wireless communication complying with the IEEE802.11 series, and controls IP (Internet Protocol) communication. The communication unit 306 controls an antenna 307 to transmit/receive a wireless signal for wireless communication. The STA 101 communicates a content such as image data, document data, or video data with the other STA via the communication unit 306.

A procedure for calculating the number of terminals which have transmitted the sync beacons in the NAN cluster to which the STA 101 belongs will be describe next with reference to FIG. 4. FIG. 4 is a flowchart illustrating an example of terminal count calculation processing. The flowchart shown in FIG. 4 starts when the STA 101 operates in the anchor master role and the DW of the NAN cluster to which the STA 101 belongs comes. Note that the flowchart shown in FIG. 4 is implemented when the control unit 302 of the STA 101 executes a control program stored in the storage unit 301 to execute calculation and processing of information and control of the respective hardware components. Note also that some or all of the steps of the flowchart shown in FIG. 4 may be implemented by hardware such as an ASIC.

First, the NAN signal reception control unit 220 receives a signal during only the period of the DW (YES in step S400 and step S401). The NAN signal identification unit 230 identifies whether the received signal is a signal about NAN (step S402). For example, the NAN signal identification unit 230 identifies whether the received signal has a format complying with the NAN standard, or whether the received signal contains a NAN information element. Note that this step can be skipped. If the received signal is a signal about NAN (YES in step S402), the NAN signal identification unit 230 identifies whether the received signal is a signal from the NAN cluster (NAN cluster 106) to which the STA 101 belongs (step S403). More specifically, the NAN signal identification unit 230 confirms whether a cluster ID contained in the received signal is equal to that recorded in the STA 101.

If the received signal is the signal of the NAN cluster to which the STA 101 belongs (YES in step S403), the NAN signal identification unit 230 identifies whether the received signal is the sync beacon as an element for calculating the number of terminals (step S404). If the received signal is the sync beacon (YES in step S404), the NAN signal identification unit 230 notifies the terminal count calculation unit 240 that the received signal is the sync beacon. Every time the notification is received, the terminal count calculation unit 240 adds the number of notifications (that is, 1) to the total number (the initial value is zero) of sync beacons (step S405). During the DW period, the STA 101 repeats the above processing (YES in step S406).

After the end of the DW period, based on the counted total number of sync beacons, the terminal count calculation unit 240 calculates the number of terminals which transmit the sync beacons (step S407). Not all the terminals joining the NAN cluster 106 can transmit the sync beacons. In this embodiment, the number of terminals capable of transmitting the sync beacons (the number of terminals as sync beacon transmission sources) in the NAN cluster 106 is set as the number of terminals of which the STA 100 is to be notified. The terminal count calculation unit 240 saves a calculation result. The above processing is performed all the time while NAN operates (while the NAN cluster is formed) (YES in step S406).

A procedure in which the STA 101 changes the master preference based on the number of terminals calculated by the terminal count calculation unit 240 will be described next with reference to FIG. 5. FIG. 5 is a flowchart illustrating an example of master preference change processing according to this embodiment. The flowchart shown in FIG. 5 starts every predetermined time when the STA 101 operates in the anchor master role. Note that the flowchart shown in FIG. 5 is implemented when the control unit 302 of the STA 101 executes a control program stored in the storage unit 301 to execute calculation and processing of information and control of the respective hardware components. Note also that some or all of the steps of the flowchart shown in FIG. 5 may be implemented by hardware such as an ASIC.

Since the master preference change control unit 250 needs to maintain the master preference at the same value for a given time (for example, 240 DWs), it determines whether the given time has elapsed after the last change (step S501). If the given time has elapsed (YES in step S501), the master preference change control unit 250 determines whether the scale of the NAN cluster has changed after the last change of the master preference. That is, the master preference change control unit 250 determines whether the calculation result of the number of terminals by the terminal count calculation unit 240 has changed after the last change of the master preference (step S502). If the scale of the NAN cluster has changed (YES in step S502), the master preference change control unit 250 changes the master preference as follows (step S503); otherwise (NO in step S502), the master preference change control unit 250 does not change the master preference (step S504).

$$(\text{master preference}) = ((X) - 1) + 128 \quad (1)$$

$$X = (\text{number of sync beacons}) + \quad (2)$$
$$1 \ [\text{number of sync beacons} f 128]$$
$$= 2^\wedge 8 \ [\text{number of sync beacons} \dagger 128]$$

Note that the above-described calculation processing is merely an example. The number of transmission sources of pieces of service information received by the STA 101 may be directly set as the master preference, or a value according to the number of transmission sources of the pieces of service information received by the STA 101 may be decided as the master preference.

A method in which the STA 101 notifies a nearby terminal of information obtained by reflecting the number of terminals will be described with reference to FIG. 6. FIG. 6 is a flowchart illustrating an example of discovery beacon transmission determination processing according to this embodiment. The flowchart shown in FIG. 6 starts when the DW of the NAN cluster to which the STA 101 belongs comes. Note that the flowchart shown in FIG. 6 is implemented when the control unit 302 of the STA 101 executes a control program stored in the storage unit 301 to execute calculation and processing of information and control of the respective hardware components. Note also that some or all of the steps of the flowchart shown in FIG. 6 may be implemented by hardware such as an ASIC.

Since the STA 101 operates in the anchor master role in the NAN cluster 106 (YES in step S600), the NAN control unit 210 of the STA 101 reflects the value of the mater preference in the anchor master rank to generate a discovery beacon. A terminal operating in the master role in the NAN cluster 106 including the STA 101 notifies a nearby terminal of the discovery beacon containing the anchor master rank (step S601). The notification processing is performed by the wireless LAN control unit 200 in the STA 101. This allows a terminal, which does not join the NAN cluster 106, to obtain information containing the number of terminals which transmit the sync beacons in the NAN cluster 106. Note that the role of the terminal may be different for each DW. The terminal joining the NAN cluster determines for each DW whether it operates in the master role (step S600). Note that the terminal which has determined that it does not operate in the master role in the NAN cluster 106 (NO in step S600) transmits no discovery beacon (step S602).

FIG. 7 shows an example of a sequence when step S601 of FIG. 6 is executed. During the DW period defined in the NAN cluster 106, the STAs 101, 102, and 103 transmit the sync beacons (S701). In accordance with the flowchart shown in FIG. 4, the STA 101 measures the number of terminals in the NAN cluster 106 based on the number of sync beacons transmitted during the DW (S702). In the example of the configuration shown in FIG. 1, the number of terminals detected by the STA 101 is 3 and the number of terminals detected by the STA 104 is 1. In accordance with the flowchart shown in FIG. 4, the STAs 101 and 104 set their master preferences according to equation (1) (S703).

More specifically, the STA 101 sets the master preference to ((3−1)+128=) 130, and the STA 104 sets the master preference to ((1−1)+128=) 128.

Since the STA 101 operates in the anchor master role in the NAN cluster 106, it transmits, to a nearby terminal, the discovery beacon containing the value of the master preference of the STA 101 (S704). The STA 100 reads values indicated by the master preferences or the like from the discovery beacons received from the NAN clusters 105 and 106, and calculates a CG (Cluster Grade). The CG is information used to select a cluster which a terminal that has detected a plurality of clusters is to join. The CG is calculated by:

$$CG=2^{64}*A1+A2$$

$A1$=master preference of anchor master $A2$=8 octets of TSF value            (3)

For the value of the CG, the value of the master preference of the anchor master is prioritized over the TSF value, as described above. Thus, the STA 100 decides to join the NAN cluster 106 in which the master preference of the anchor master is larger. As described above, the STA 100 can receive the information obtained by reflecting the number of terminals which have transmitted the sync beacons, and decide to join the NAN cluster in which the number is larger.

According to this embodiment, information about the scale of the cluster is reflected in the CG as information used to select a cluster. Therefore, the STA 100 which is to newly join a NAN cluster can join a NAN cluster whose scale is larger. Consequently, the probability that the STA 100 can detect another terminal capable of executing a service application desired by the STA 100 is increased.

In this embodiment, using the number of terminals which have transmitted the sync beacons has the following advantages. That is, assuming that there exist terminals capable of transmitting the sync beacons at a given rate among terminals joining each NAN cluster over the system, it is possible to fairly obtain pieces of information about the numbers of terminals in a plurality of NAN clusters. Even if a terminal which is to newly join requests or provides a service application, it can join a NAN cluster in which the number of terminals is larger and desired information is obtained at higher probability.

In this embodiment, changing the value of the master preference by reflecting the number of terminals has the following advantage. That is, if a terminal which is to newly join a NAN cluster discovers a plurality of NAN clusters, it considers the values of the master preferences as a reference for determining a NAN cluster to join, and need not analyze other signals.

Note that a case in which the STA 101 changes the master preference in accordance with the number of transmission sources of the received pieces of service information has been described above. However, the STA 101 may transmit the discovery beacon or sync beacon by containing, in it, information indicating the number of transmission sources of the received pieces of service information.

Furthermore, in the above description, the STA 101 has the arrangement of detecting the number of transmission sources of the received sync beacons. However, the STA 101 may detect the number of terminals which join the cluster, by including the transmission sources of terminals which transmit other SDFs.

Second Embodiment

As the second embodiment, a case in which the total number of terminals that transmit service request signals in a NAN cluster is calculated as the number of terminals, a notification of which is to be sent will be described. The service request signal to be described here indicates, for example, a subscribe signal complying with the NAN standard, which is transmitted during the DW. The subscribe signal is a signal transmitted to indicate the type and option of a service requested by the terminal which transmits the signal.

In this embodiment, a terminal operating in the anchor master role calculates the number of terminals which transmit service request signals, and notifies a nearby terminal of it. Thus, a terminal which is to newly join a NAN cluster can select to join a NAN cluster in which a larger number of services have been requested. A description of the same points as in the first embodiment will be omitted.

FIG. 8 is a functional block diagram showing an STA 101 according to this embodiment. This embodiment has, as its feature, to perform, by each of the STA 101 and an STA 104, an operation to be described below. The STAs 101 and 104 have the same arrangement, and only the STA 101 will be described. Details of the respective functions are the same as those in FIG. 2 described in the first embodiment and a description thereof will be omitted. The difference from the first embodiment is that a NAN signal identification unit 830 identifies service request signals to calculate the number of terminals, and a terminal count calculation unit 840 calculates the number of service request signals.

A procedure for calculating the number of terminals which have transmitted service request signals in the NAN cluster will be described next with reference to FIG. 9. FIG. 9 is a flowchart illustrating an example of terminal count calculation processing according to this embodiment. Details of respective processes are the same as those in FIG. 4 described in the first embodiment and a description thereof will be omitted. The difference from the first embodiment is that the NAN signal identification unit 830 identifies in step S904 whether a received signal is a service request signal and the terminal count calculation unit 840 calculates, in step S905, the number of service request signals.

FIG. 10 shows an example of the structure of the beacon frame of a discovery beacon. The beacon frame is based on the IEEE802.11 standard, and is formed from an FC (Frame Control), a duration, and the like. In the NAN standard, a NAN information element (to be referred to as a NAN IE hereinafter) 1000 is defined as one of the components of the beacon frame. The NAN IE 1000 includes NAN attributes 1001. The NAN attributes 1001 can include vendor specific attributes 1006. The terminal can freely input information to the vendor specific attributes 1006. Thus, in this embodiment, the terminal operating in the anchor master role adds an information type 1002 indicating that information input to the subsequent field represents the number of terminals. The terminal also adds a length 1003 indicating the length of the field. The terminal subsequently adds a signal type 1004 indicating that the service request signals are used as a reference for counting the number of terminals, and a signal count 1005 indicating the number of service request signals (that is, the number of terminals which transmit the service request signals). The terminal which is to newly join a NAN cluster can select a NAN cluster to join, by receiving and analyzing the information.

Processing in which the STA 101 notifies a nearby terminal of the information obtained by reflecting the number of terminals according to this embodiment is the same as that shown in FIG. 6 described in the first embodiment and a description thereof will be omitted. In this embodiment, however, a sequence when step S601 of FIG. 6 is executed is different. This sequence will be described with reference to FIG. 11.

FIG. 11 shows an example of the sequence when step S601 of FIG. 6 is executed. During a DW period defined in a NAN cluster 106, STAs 102 and 103 respectively transmit service request signals (S1101). The STA 101 measures the number of service request signals transmitted during the DW, and saves the measured number in the terminal count calculation unit 840 (S1102). In the example of the configuration shown in FIG. 1, the number of signals calculated by the STA 101 is 2 and the number of signals calculated by the STA 104 is 0. The STA 101 includes the calculated number in the NAN attributes 1001 shown in FIG. 10, and transmits the information as a discovery beacon. This allows the STA 100 to receive the information containing the number of terminals as the transmission sources of the service request signals transmitted in the NAN cluster 106.

As described above, in this embodiment, the terminal operating in the anchor master role notifies a nearby terminal of the number of terminals which have transmitted the service request signals, thereby obtaining the following advantages. That is, if a terminal which is to newly join a NAN cluster discovers a plurality of NAN clusters, it can join a NAN cluster which requests a larger number of services. Furthermore, if a terminal belonging to a NAN cluster in which a small number of services have been requested receives the discovery beacon of a NAN cluster in which the number of service request signals is large, it can join the NAN cluster. Consequently, a terminal joining a NAN cluster in which the number of terminals each requesting a service is large can provide a service to many terminals, as compared with a case in which the terminal simply joins a NAN cluster in which the number of terminals is large.

More specifically, consider a case in which a terminal that is to newly join a NAN cluster can provide a service. Assume that the terminal discovers the following two NAN clusters. One of the clusters is the first NAN cluster which many terminals join and which includes many terminals each providing a service. The other is the second NAN cluster which a smaller number of terminals join and which includes a larger number of terminals each issuing a service request, as compared with the first NAN cluster. Assuming that a terminal desires to provide a service to a larger number of terminals, the terminal desirably joins the second NAN cluster. According to this embodiment, the terminal can join the second NAN cluster to provide the service to a larger number of terminals. For a terminal which joins a NAN cluster and generates a service request signal, the probability that the demand is satisfied is increased when the terminal for providing the service joins the NAN cluster.

In this embodiment, containing the number of terminals which have transmitted the service request signals in the discovery beacon has the following advantage. That is, a terminal which is to newly join a NAN cluster can increase a reference for selecting a NAN cluster. In this embodiment, a terminal whose purpose is to join a NAN cluster and provide a service can select a more appropriate NAN cluster in accordance with the purpose.

Note that the terminal operating in the anchor master role contains, in the discovery beacon, the number of terminals which transmit the service request signals in this embodiment. In addition to or instead of this, the number of terminals which transmit service provision signals may be contained. The service provision signal will be described in the third embodiment. In this case, a terminal which is to newly join a NAN cluster can select an appropriate NAN cluster in accordance with the purpose of providing or receiving a service.

Third Embodiment

The third embodiment will describe a case in which the total number of terminals that transmit different types of service provision signals in a NAN cluster is calculated as the number of terminals, a notification of which is to be sent. The service provision signal to be described here indicates, for example, a publish signal complying with the NAN standard, which is transmitted during the DW. The publish signal is a signal transmitted to indicate the type and option of a service requested by the terminal which transmits the signal. In this embodiment, when a terminal operating in the anchor master role transmits a discovery beacon containing the number of terminals that transmit different types of service provision signals, a terminal which is to newly join a NAN cluster can join a NAN cluster in which a larger number of types of services are provided. This embodiment has, as its feature, to perform, by each of STAs 101 and 104, an operation to be described below. A description of the same points as in the first and second embodiments will be omitted.

The functional blocks of the STA 101 according to this embodiment are the same as those shown in FIG. 8 described in the second embodiment and a description thereof will be omitted. The difference from the second embodiment is that a buffer for recording a service ID indicating a service type is included in order for a terminal count calculation unit 840 to measure service types.

A procedure in which the STA 101 calculates the number of terminals based on the number of types of service provision signals will be described with reference to FIG. 12. FIG. 12 is a flowchart illustrating an example of terminal count calculation processing according to this embodiment. The STAs 101 and 104 have the same arrangement, and only the STA 101 will be described. Processes up to step S1203 of FIG. 12 are the same as those up to step S903 of FIG. 9 described in the second embodiment and a description thereof will be omitted. Note that the terminal count calculation unit 840 records a service ID indicating a service type in the buffer based on an already received service provision signal.

If the received signal is identified in step S1203 as a signal of a NAN cluster to which the STA 101 belongs (YES in step S1203), a NAN signal identification unit 830 identifies whether the received signal is a service provision signal (step S1204). If the received signal is a service provision signal (YES in step S1204), the NAN signal identification unit 830 notifies the terminal count calculation unit 840 that the service provision signal has been received. Upon receiving the notification, the terminal count calculation unit 840 determines whether a service ID corresponding to the received service provision signal is different from that recorded in the buffer (step S1205). If the service IDs are different from each other (NO in step S1205), the service ID corresponding to the received service provision signal is recorded in the buffer, and 1 is added to the number (the initial value is zero) of service types (step S1206). The STA 101 repeats the above processing during the DW period (YES in step S1207). If the DW period ends (NO in step S1207), the terminal count calculation unit 840 calculates the number of types of service provision signals as the number of terminals capable of providing different services (step S1208). The above processing is performed all the time while NAN operates.

The structure of the beacon frame of the discovery beacon according to this embodiment is the same as that shown in FIG. 10 described in the second embodiment and a description thereof will be omitted. This embodiment is different from the second embodiment in that an information type field 1002 indicates that the signal has a type of service provision signal, and a terminal count field 1005 indicates the type of service provision signal.

Processing in which the STA 101 notifies a nearby terminal of information obtaining by reflecting the number of terminals according to this embodiment is the same as that shown in FIG. 6 described in the first embodiment and a description thereof will be omitted. In this embodiment, however, a sequence when step S601 of FIG. 6 is executed is different. This sequence will be described with reference to FIG. 13.

FIG. 13 shows an example of the sequence when step S601 of FIG. 6 is executed. During a DW period defined in a NAN cluster 106, STAs 102 and 103 respectively transmit service provision signals (S1301). The STA 101 saves the number of types of service provision signals transmitted during the DW as the number of terminals in the terminal count calculation unit 840 (S1302). More specifically, if a service ID corresponding to the service provision signal transmitted by the STA 102 is equal to that corresponding to the service provision signal transmitted by the STA 103, the number of terminals calculated by the STA 101 is 1. Furthermore, the number of terminals calculated by the STA 104 is 0. The STA 101 includes the saved number of terminals in the NAN attributes 1001 shown in FIG. 10, and transmits the information as a discovery beacon. This allows the STA 100 to receive the information containing the number of types of service provision signals transmitted in the NAN cluster.

As described above, in this embodiment, the terminal operating in the anchor master role notifies a nearby terminal of the number of types of service provision signals, thereby obtaining the following advantages. That is, if a terminal which is to newly join a NAN cluster discovers a plurality of NAN clusters, it can join a NAN cluster in which a larger number of types of services are provided. Furthermore, if a terminal belonging to a NAN cluster in which a small number of types of services are provided receives the discovery beacon of a NAN cluster in which a large number of types of services are provided, it can join the NAN cluster in which a large number of types of services are provided. This allows a terminal which is to join a NAN cluster and issue a service request can select a NAN cluster in which a larger number of types of services can be provided. By excluding a service provision signal indicating the same service ID from a count target, a terminal which is to newly join a NAN cluster can obtain information in which the service type has been correctly reflected.

Fourth Embodiment

The fourth embodiment will describe a case in which the total number of terminals that transmit sync beacons in a NAN cluster whose scale is larger is calculated. In this embodiment, a terminal operating in the anchor mater role performs an operation for calculating the number of terminals each existing at a position where it cannot directly receive a signal, in addition to the operation described in the first embodiment. In this embodiment, similarly to the first embodiment, the terminal operating in the anchor master role calculates the number of terminals which have transmitted sync beacons as the number of terminals, a notification of which is to be sent. Furthermore, in this embodiment, the terminal operating in the anchor master role indirectly notifies a nearby terminal of the number of terminals by transmitting a discovery beacon containing a changed master preference, similarly to the first embodiment.

This embodiment has, as its feature, to perform, by each of STAs 101 to 104, an operation to be described below. A description of the same points as in the first embodiment will be omitted. Since the STAs 101 and 104 have the same arrangement and the STAs 102 and 103 have the same arrangement, only the STAs 101 and 103 will be described below in terms of the same points.

FIG. 14 shows an example of a network configuration assumed in this embodiment. FIG. 14 shows a NAN cluster whose scale is enlarged, as compared with the NAN cluster shown in FIG. 1. In addition to the STAs 100 to 104 shown in FIG. 1, STAs 1400 to 1406 exist. The STAs 1401 to 1406 are terminals joining a NAN cluster 106. In this embodiment, the STA 1401 operates in the master role.

The functional block arrangement of each of the STAs 101 and 103 according to this embodiment and the flowchart of master preference change processing according to this embodiment are respectively the same as those shown in FIGS. 2 and 5 described in the first embodiment, and a description thereof will be omitted. Note that processing executed by a terminal count calculation unit 240 is different from that in the first embodiment. A procedure in which the STAs 101 and 103 calculate the number of terminals which have transmitted sync beacons based on the number of sync beacons and pieces of information contained in the sync beacons will be described with reference to FIG. 15.

Figure 15:
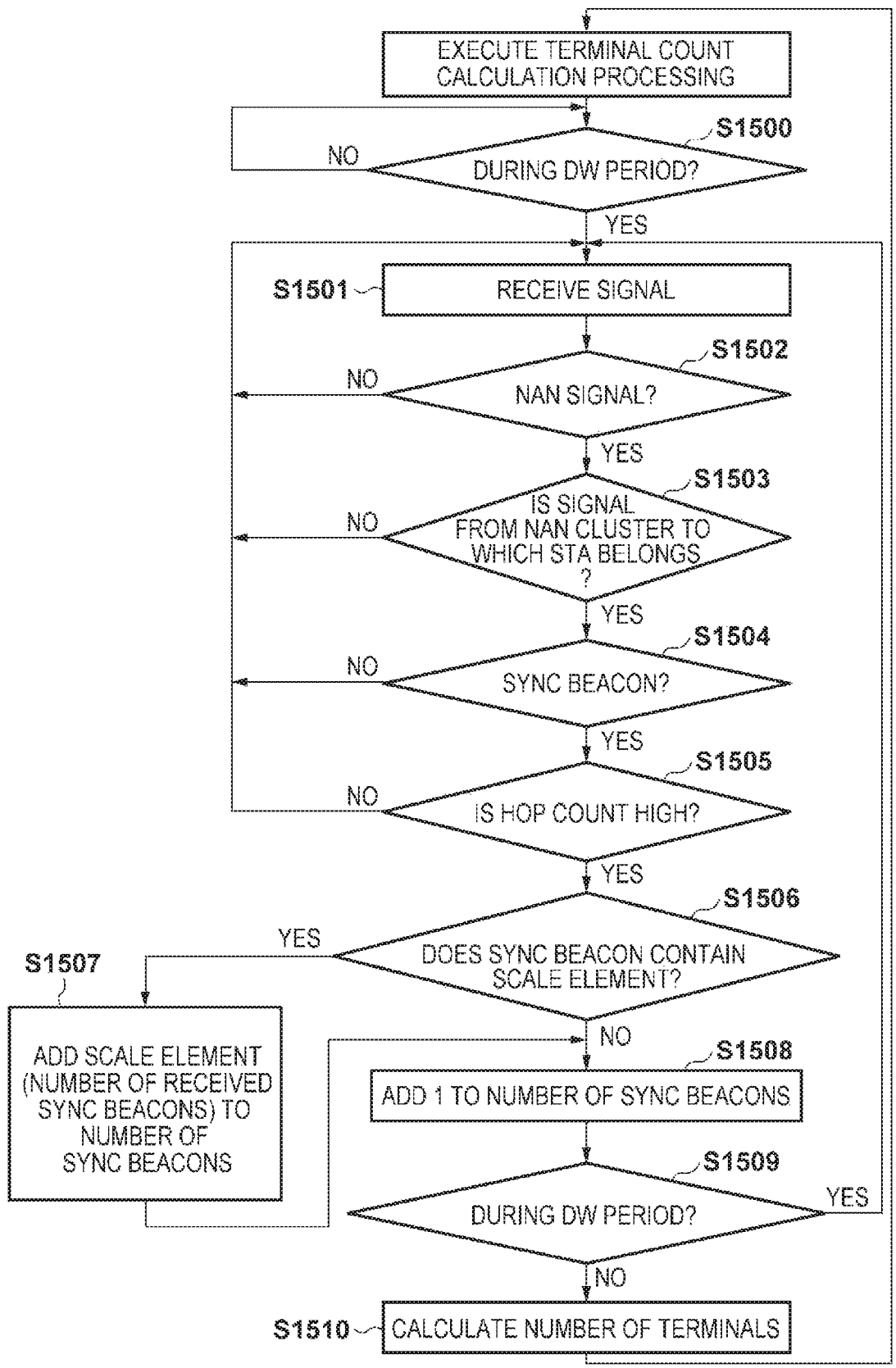
FIG. 15 is a flowchart illustrating an example of terminal count calculation processing according to the fourth embodiment.

FIG. 15 is a flowchart illustrating an example of terminal count calculation processing according to this embodiment. Processes up to step S1504 are the same as those up to step S404 of FIG. 4 described in the first embodiment and a description thereof will be omitted. If it is determined in step S1504 that a received signal is a sync beacon (YES in step S1504), the terminal count calculation unit 240 analyzes contents of the sync beacon, and determines whether the hop count of the terminal which has transmitted the sync beacon is higher than that of the self terminal (step S1505). The hop count indicates the number of intermediate terminals (that is, the STA 101) from the terminal for transmitting a signal to a terminal operating in the anchor master role. In the example of the configuration shown in FIG. 14, the hop counts of the STAs 101, 103, and 102 are respectively 0, 1, and 2. Since the hop counts of the STAs 103 and 102 are higher than that of the STA 101 (YES in step S1505), the process advances to step S1506. The processing in step S1505 is performed to more quickly and efficiently transmit the discovery beacon to the STA 100, and can be skipped.

In step S1506, the terminal count calculation unit 240 determines whether the received sync beacon contains the number (scale element) of sync beacons received by each terminal (step S1506). If the received sync beacon contains the number of sync beacons received by each terminal (YES in step S1506), the terminal count calculation unit 240 performs update processing by adding the number of sync beacons received by each terminal to the total number of sync beacons (step S1507). Even if the received sync beacon contains no number of sync beacons received by each terminal, the terminal count calculation unit 240 increments the total number of sync beacons by one (step S1508). The STA 101 repeats the above processing during the DW period (step S1509). After the end of the DW period, the terminal count calculation unit 240 calculates the number of terminals from the counted total number of sync beacons, as follows, and saves a calculation result (step S1510).

$$\begin{aligned}\text{(number of terminals)} =& \\ \text{(number of sync beacons)} + 1 \ &[\text{number of sync beacons } f\ 128] = \\ &2^{\wedge}8 \ [\text{number of sync beacons } \dagger\ 128]\end{aligned} \quad (4)$$

Figure 16:
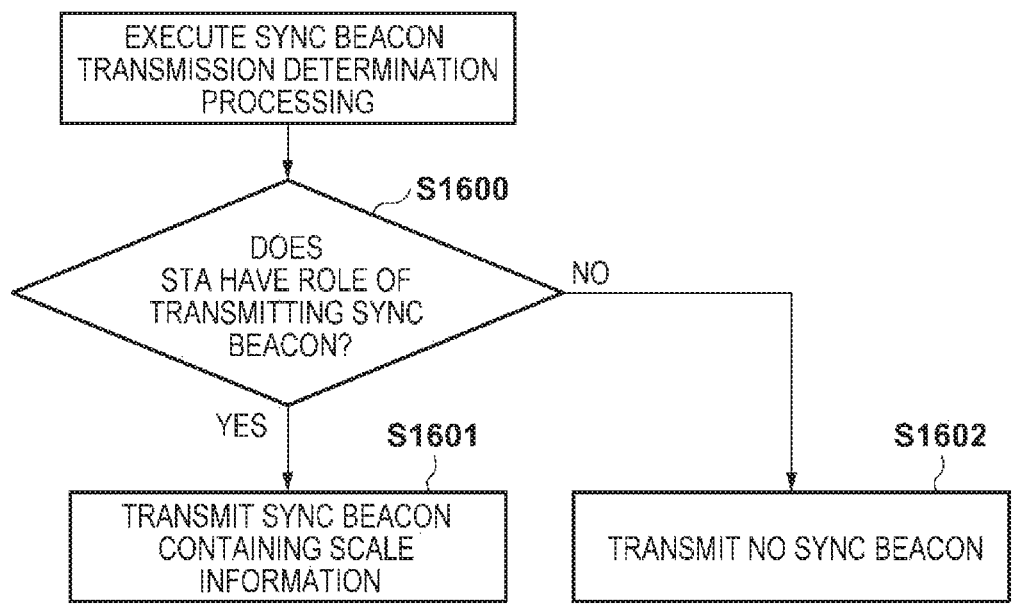
FIG. 16 is a flowchart illustrating an example of sync beacon transmission determination processing according to the fourth embodiment.

The structure of the beacon frame of the discovery beacon according to this embodiment is the same as that shown in FIG. 10 described in the second embodiment, and a description thereof will be omitted. A procedure in which the STA 103 relays terminal count information to the STA 101 will be described with reference to FIG. 16. FIG. 16 is a flowchart illustrating an example of sync beacon transmission determination processing according to this embodiment. First, the STA 103 determines whether it has a role of transmitting the sync beacon. That is, the STA 103 determines whether it operates in the master role or it does not operate in the master role but can transmit the sync beacon. Since the STA 103 operates in the master role (YES in step S1600), it transmits the sync beacon containing terminal count information (scale information) in accordance with the beacon structure example shown in FIG. 10 (step S1601). The STA 101 can receive the sync beacon from the STA 103, and calculate, based on the sync beacon, the number of terminals by including the number of terminals from which the STA 101 cannot directly receive signals. The above processing is performed all the time while NAN operates.

Figure 17:
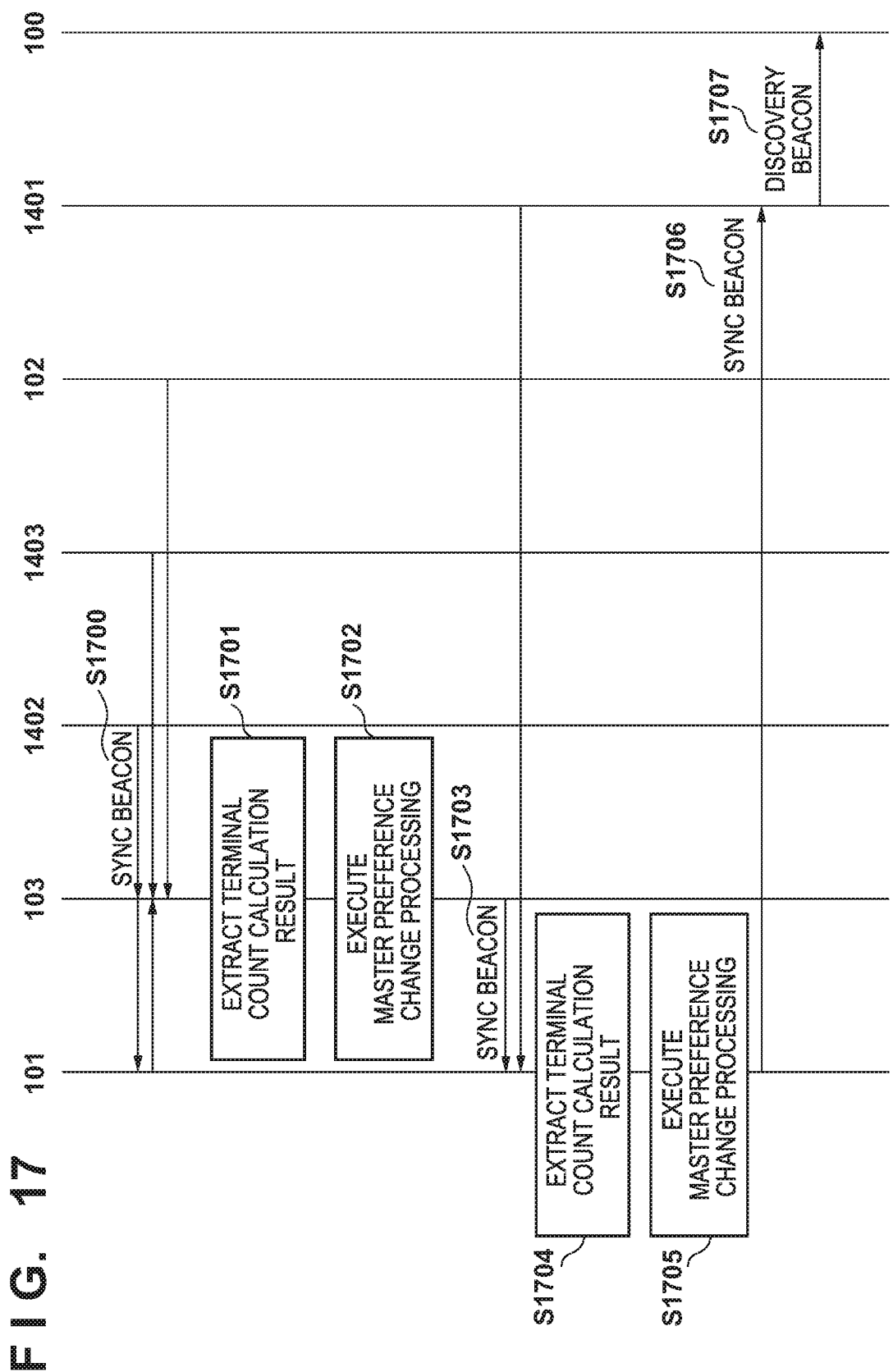
FIG. 17 is a sequence chart showing an example of a sequence when the number of terminals which have transmitted signals is calculated and a nearby terminal is notified of a change according to the fourth embodiment.

A method in which the STA 101 notifies a nearby terminal of information obtained by reflecting the number of terminals according to this embodiment is the same as that shown in FIG. 6 described in the first embodiment and a description thereof will be omitted. FIG. 17 shows an example of a sequence when the STA 1401 executes step S601 of FIG. 6. FIG. 17 shows a sequence example when the number of terminals which have transmitted signals is calculated and a nearby terminal is notified of a change according to this embodiment. The processing shown in FIG. 17 will be schematically explained. First, the STA 103 executes the processing in step S1601 of FIG. 16. Next, the STA 101 executes the processing in step S503 of FIG. 5, and transmits, based on the procedure defined in NAN, the sync beacon obtained by reflecting the changed master preference. Lastly, the STA 1401 executes the processing in step S601 of FIG. 6.

Referring to FIG. 17, among the terminals joining the NAN cluster 106, terminals each having a role of transmitting a sync beacon transmit the sync beacons during a DW period defined in the NAN cluster 106 (S1700). In accordance with the procedure shown in FIG. 15, the STA 103 calculates, based on equation (3), the number of terminals which have transmitted the signals within a range where the self terminal can receive signals in the NAN cluster 106 (S1701). The STA 103 saves a calculation result. In the example of the configuration shown in FIG. 14, the number of terminals calculated by the STA 103 is 7. The STA 103 changes its master preference in accordance with the procedure shown in FIG. 5 (S1702). More specifically, the master preference of the STA 103 is set to ((7−1)+128=) 134. If the STA 103 has the role of transmitting the sync beacon, it contains the calculation result of the calculated number of terminals in the sync beacon, and transmits the sync beacon to a nearby terminal during the DW (S1703).

The STA 101 operating in the anchor master role in the NAN cluster 106 calculates the number of terminals in the overall NAN cluster 106 by calculating the number of terminals in accordance with the procedure shown in FIG. 15 (S1704). In the example of the configuration shown in FIG. 14, the number of terminals calculated by the STA 101 is 10. With reference to the result, the STA 101 changes its master preference (S1705). More specifically, the master preference of the STA 101 is set to ((10−1)+128=) 137. Thus, the STA 101 can contain, in the discovery beacon, as the anchor master rank, the master rank obtained by reflecting the master preference, and notify a nearby terminal of the discovery beacon. Furthermore, this value is contained in the sync beacon, and a nearby terminal belonging to the NAN cluster is notified of the sync beacon (S1706). Lastly, based on FIG. 5, the STA 1401 contains the anchor master rank in the discovery beacon, and transmits the discovery beacon. This allows the STA 100 to receive the information obtained by reflecting the number of terminals which have transmitted the sync beacons in the NAN cluster 106 (S1707).

As described above, in this embodiment, even if a terminal operating in the anchor master role cannot directly receive signals, it is possible to calculate the number of terminals which have transmitted the sync beacons in the NAN cluster 106, by counting the number of relay terminals. As enlargement of the NAN cluster progresses, the number of signals which can be directly received can be limited. However, by providing relay terminals as in this embodiment, even in the enlarged NAN cluster, a terminal which is to newly join a NAN cluster can receive information obtained by reflecting the number of terminals joining the NAN cluster.

Modification

The systems shown in FIGS. 1 and 14 for explaining the first to fourth embodiments are merely examples. For example, a system may include any number of terminals having different roles, and the number of terminals may be different from those in FIGS. 1 and 14. A timing at which a terminal operating in the anchor master role transmits a discovery beacon may be different from that described in each embodiment. For example, in the first to fourth embodiments, the terminal operating in the anchor master transmits the discovery beacon every 100 TUs. However, the discovery beacon may be transmitted every 80 TUs or every 90 TUs. Furthermore, in the first to fourth embodiments, the number of signals during one DW is set as an element of a NAN cluster. However, the cumulative value of the numbers of signals during a plurality of DWs may be used. For example, the number of terminals can be calculated using the cumulative value of signals transmitted during past two DWs.

Although the sequence of calculating the number of terminals is operated all the time while the NAN function operates in the first to fourth embodiments, it may be operated by a trigger. For example, a terminal for calculating the number of terminals may calculate the number of terminals every time the DW period ends or immediately before each DW period starts. If the types of terminals for transmitting signals are the same, signals transmitted from the respective terminals are processed as different signals in the above-described embodiments but may be processed as one signal.

The equation for terminal count calculation and that for the master preference in the first and fourth embodiments are merely examples. Any equations which increase the value of the number of terminals along with an increase in the number of signals hold. For example, by considering a case in which terminals for transmitting no signals also exist, calculation may be performed by assuming that the number of terminals is twice the number of sync beacons. Conversely, calculation may be performed by assuming that the number of terminals is ½ the number of sync beacons. By considering a value range, the master preference may be incremented by one for every two terminals. Conversely, the master preference may be incremented by two for each terminal.

The timings at which the master preference is changed in the first and fourth embodiments are merely examples, and the master preference may be changed by an arbitrary trigger. For example, the terminal operating in the anchor master role may confirm whether the master preference can be changed every time the DW period ends, or periodically confirm whether to change the master preference during a changeable period. A period during which the master preference is fixed may be a period different from the above-described one, and may be, for example, a period of 350 DWs.

In the second to fourth embodiments, terminal count information is included in the vendor specific attributes of the beacon frame. However, this is merely an example. A method of including a value in the serviceInfo field of the service descriptor attribute of the beacon frame may be considered.

Furthermore, in the fourth embodiment, a signal transmitted from a given terminal can be received by a plurality of terminals, and the information of the terminal may be calculated as a plurality of terminals. Thus, if a plurality of terminals receive a signal, it may be determined to eliminate the overlapping.

Each of the first to fourth embodiments can be solely executed. These embodiments, however, can be executed in combination. In addition to the methods described in the above-described embodiments, the following terminal count notification methods can be considered. For example, the number of sync beacons described in the first embodiment may be included in the beacon frame, and the number of service provision signals may be reflected in the value of the master preference. The number of service request signals described in the second embodiment may be reflected in the value of the master preference, and the number of types of service provision signals described in the third embodiment may be reflected in the value of the master preference. The number of types of service request signals may be reflected in the value of the master preference, and the number of service provision signals may be included in the beacon frame. The number of types of service request signals may be included in the beacon frame. The fourth embodiment may be applied to the first to third embodiments, and the terminal operating in the anchor master role may calculate the number of terminals with respect to indirectly received signals (relayed and received signals).

A case in which information indicating the scale of the NAN cluster based on information received by the anchor master is transmitted has been described. However, an apparatus having another role may transmit the information. For example, a master which does not operate in the anchor master role may contain, in a sync beacon or discovery beacon, the information indicating the scale of the NAN cluster based on received information, and transmit the sync beacon or discovery beacon.

As described above, according to the above-described embodiments, a terminal which is to newly join a NAN cluster can join a NAN cluster which receives desired information at higher probability, by dynamically sending a notification of the number of terminals calculated based on signals in the NAN cluster. A terminal joining a NAN cluster which receives desired information at low probability can move to a NAN cluster having higher probability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-187442, filed Sep. 24, 2015 which is hereby incorporated by reference herein in its entirety.

The invention claimed is:

1. A wireless communication apparatus comprising:
one or more processors; and
one or more memories including instructions that, when executed by the one or more processors, cause the wireless communication apparatus to:
receive signals during a discovery window of Neighbor Awareness Networking (NAN);
determine, based on the received signals, a number of types of service being provided in a NAN cluster to which the wireless communication apparatus belongs; and
transmit a discovery beacon containing information about the NAN cluster, the information being based on the determined number of types of service being provided in the NAN cluster.

2. The wireless communication apparatus according to claim 1, wherein the received signals are publish signals defined in the Neighbor Awareness Networking (NAN).

3. The wireless communication apparatus according to claim 1, wherein the execution of the instructions further causes the wireless communication apparatus to:
record a service ID indicating a service type,
wherein the determination is made based on the recorded service ID.

4. A method of controlling a wireless communication apparatus, the method comprising:
receiving signals during a discovery window of Neighbor Awareness Networking (NAN);
determining, based on the received signals, a number of types of service being provided in a NAN cluster to which the wireless communication apparatus belongs; and
transmitting a discover beacon containing information about the NAN cluster, the information being based on the determined number of types of service being provided in the NAN cluster.

5. A non-transitory computer-readable storage medium storing a computer program for causing a computer to execute a method of controlling a wireless communication apparatus, the method comprising:
receiving signals during a discovery window of Neighbor Awareness Networking (NAN);
determining, based on the received signals, a number of types of service being provided in a NAN cluster to which the wireless communication apparatus belongs; and
transmitting a discover beacon containing information about the NAN cluster, the information being based on the determined number of types of service being provided in the NAN cluster.

* * * * *